Jan. 7, 1936.  T. C. McVEAGH  2,026,586
SECURING DEVICE
Filed March 31, 1934   3 Sheets-Sheet 3

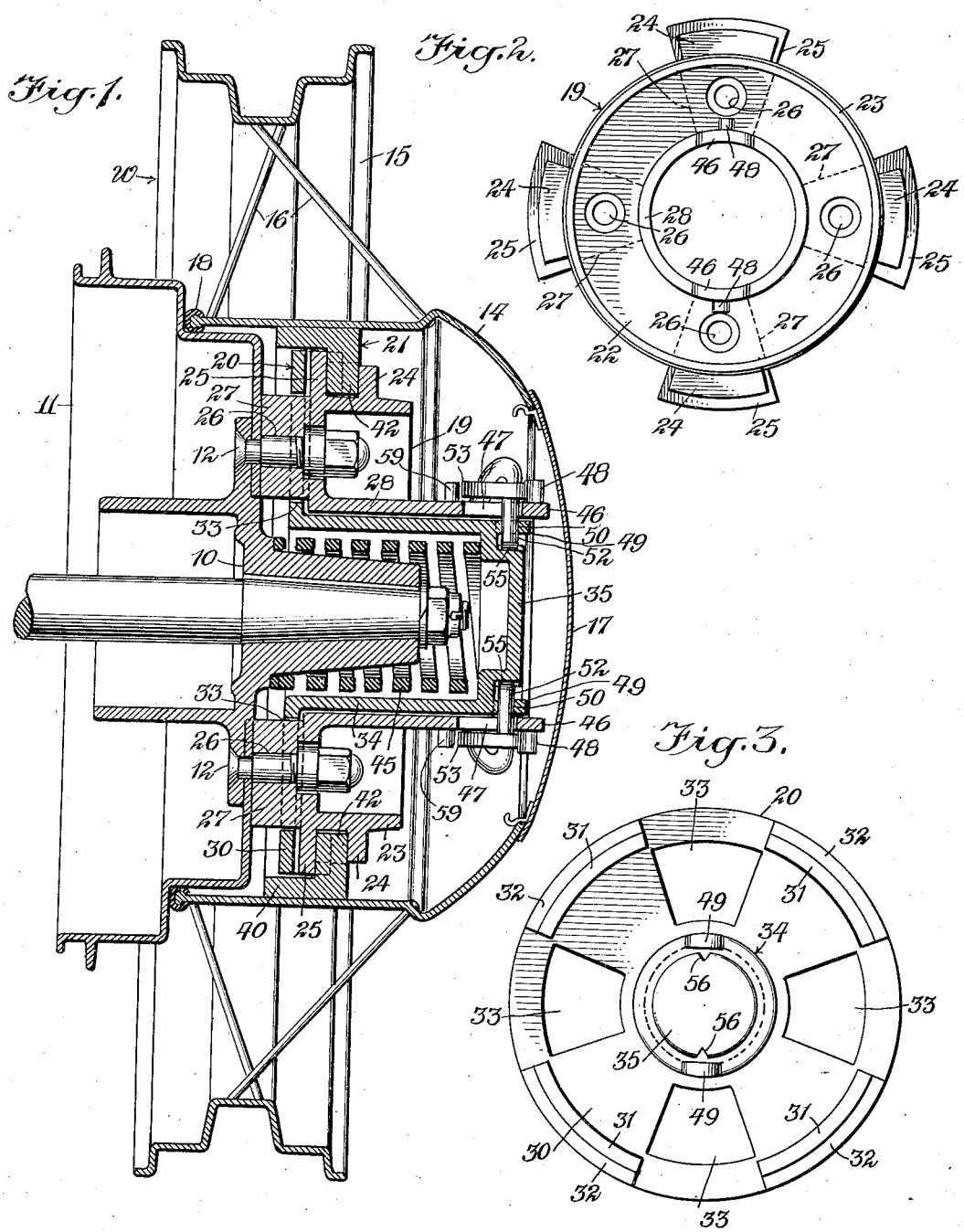

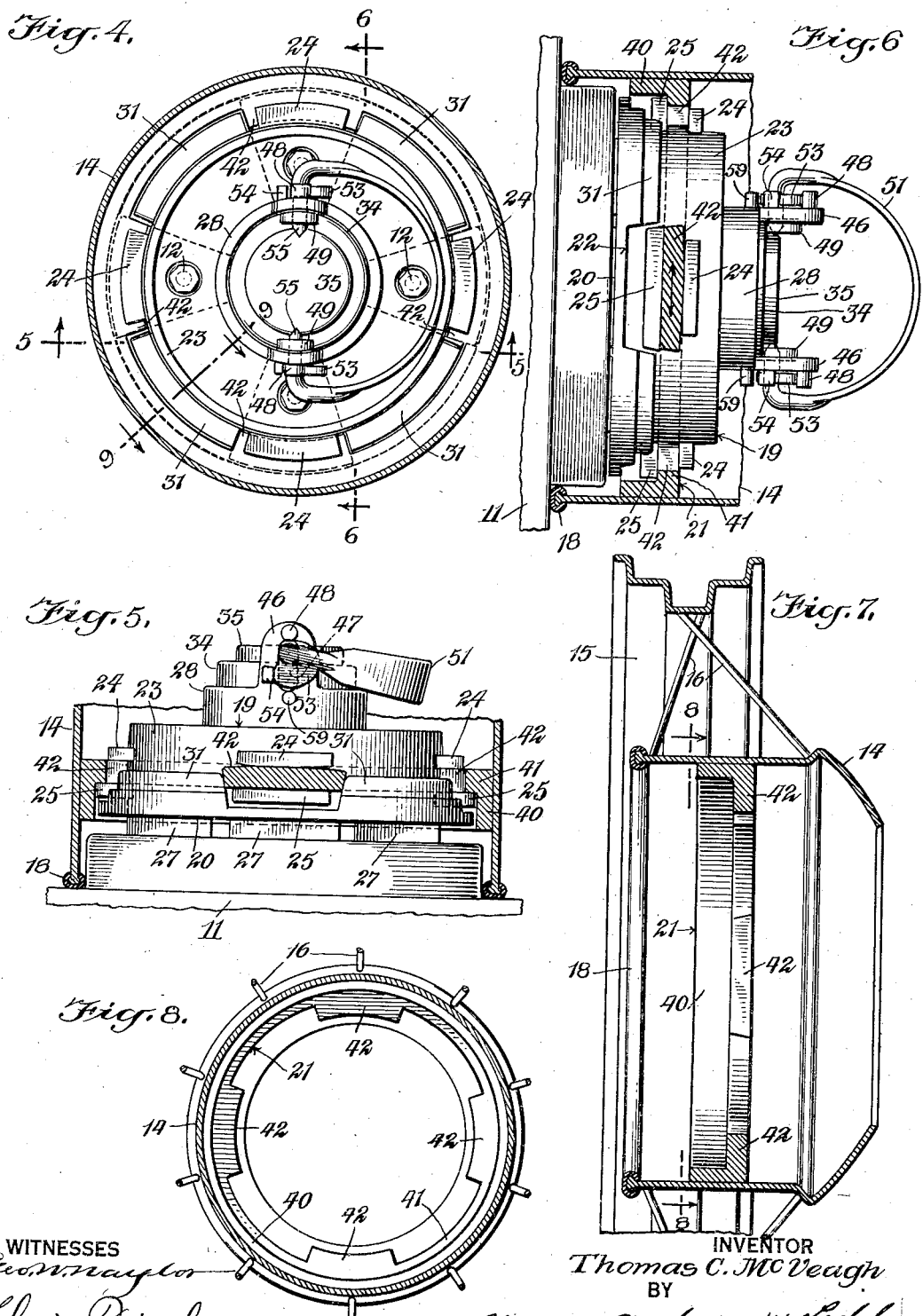

WITNESSES
INVENTOR
Thomas C. McVeagh
BY
ATTORNEYS

Patented Jan. 7, 1936

2,026,586

UNITED STATES PATENT OFFICE 2,026,586

SECURING DEVICE

Thomas C. McVeagh, Honolulu,
Territory of Hawaii

Application March 31, 1934, Serial No. 718,461

19 Claims. (Cl. 301—9)

This invention relates to a securing device which may be used advantageously for quickly and easily attaching and detaching a vehicle wheel.

An object of the invention is the provision of a device of the indicated character which does not require the use of tools in attaching and detaching a wheel.

Another object of the invention is the provision of a device of the indicated character which will be compact and durable in use, and which provides parts well suited for economic manufacture and assembly.

With the foregoing, other objects of the invention will appear from the embodiment of the invention which, by way of example, is described in the following specification and illustrated in the accompanying drawings, in which Figure 1 is a section of a vehicle wheel selected to illustrate the securing device of the invention shown applied thereto and securing the wheel;

Figure 2 is a view of the carrier part;

Figure 3 is a view of the securing part;

Figure 4 is a side view and part section of the device;

Figure 5 is a section taken approximately on the line 5—5 of Figure 4 and looking in the direction indicated by the arrows;

Figure 6 is a section taken approximately on the line 6—6 of Figure 4, and looking in the direction indicated by the arrows;

Figure 7 is a section of the wheel, portions being broken away;

Figure 8 is a section taken on the line 8—8 of Figure 7 and looking in the direction indicated by the arrows;

Figure 10:
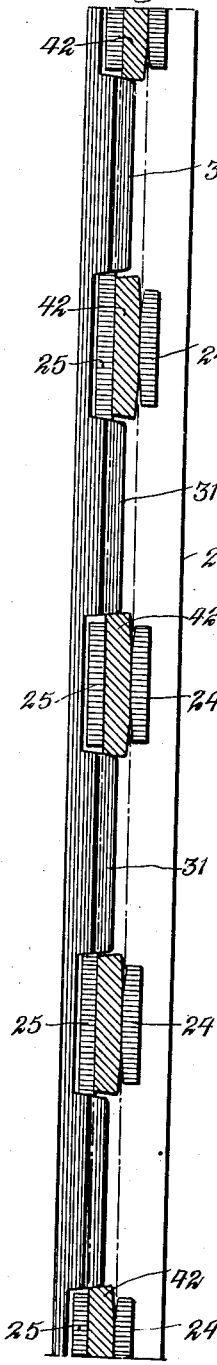
Figure 10 is a diagrammatic view illustrating the relation of the carrier part, securing part and detachably secured part in securing or detaching the wheel.

In the drawings there is shown a hub 10, having secured thereto a brake drum 11 by any suitable number of bolts 12, there being four in the present instance, spaced equidistantly. There is also shown a wheel W consisting of a hub housing or shell 14, a tire carrying rim 15, and interlaced wire spokes 16 connecting the hub shell 14 with the rim 15. The type of wheel may be either what is known as a wire wheel or a disk wheel, but should have a large central hub shell, as shown. This hub shell includes a removable cap 17 which affords access to the securing device of the present invention which, in the illustrated embodiment of the invention, is housed within the shell 14. The cap 17 might, if desired, be fitted with a lock to prevent theft of the wheel. The hub shell 14 closely approximates the brake drum 11; and in order to exclude dust, dirt and other foreign matter from entering the shell 14 between the latter and the brake drum the inner circular edge portion of the hub shell may be provided with a rubber ring 18 for contactual engagement with the drum 11, as shown most clearly in Figure 1.

The device of the present invention, by which the stated objects are obtained, includes three main parts consisting of a carrier part 19, a securing part 20 and a detachably secured part 21. The part 19 is shown most clearly in Figure 2, the part 20 is shown most clearly in Figure 3, and the part 21 is shown most clearly in Figure 8. The carrier part 19 is circular and consists of a disk 22 having a circular flange 23 projecting from one side face thereof and perpendicularly with respect thereto at its periphery. Arranged on the flange 23 are pairs of spaced radially outwardly extending lugs, there being four pairs of lugs in the present instance, the lugs of each pair being designated 24 and 25 respectively and these pairs of lugs being spaced equidistantly with respect to each other. Each of the lugs 24 and 25 is of sector shape. The lugs 24 are smaller in size than the lugs 25, and the lugs 25 are of two sizes, alternately larger and smaller. The pairs of lugs 24 and 25 are in radial alignment respectively, with bolt holes 26 corresponding in number and arrangement to the number and arrangement of the bolts 12. The disk 22 has spacer lugs 27 integral therewith on the side opposite that having the flange 23. In the present instance there are four of these lugs 27 spaced equidistantly adjacent the pairs of lugs 24 and 25 respectively, and the bolt holes 26 extend through the lugs 27 respectively. The lugs 27 also are of sector shape. The disk 22 on the side thereof having the flange 23 has a cylinder 28 located centrally thereof and open at each end.

The securing part 20, shown in Figure 3, is of circular formation and consists of a disk 30 having axially extending lugs 31 on one face thereof, there being four in number, and spaced equidistantly with respect to each other at the periphery of the disk. The lugs 31 are of sector shape and each has a shoulder 32, and are of a size to be received in the spaces respectively between the lugs 25 on the part 19. The disk 30 has sector shaped openings 33 therein, there being four of these openings corresponding to the spacer lugs 27 which are receivable therein. The disk 30 has a cylinder 34 on the side thereof having the lugs 31 and arranged axially or centrally of the disk 30. The outer end of the cylinder 34 has a head 35. The cylinder 34 is smaller in diameter than the diameter of the cylinder 28 so as to be disposed within the latter.

The detachably secured part 21 is of circular formation, and this part consists of a ring or annular member 40 having a radially inwardly extending flange 41 and four radially inwardly extending lugs 42 on the flange 41. The lugs 42 are spaced equidistantly and are of sector shape to be received respectively between the pairs of lugs 24 and 25 of the carrier part 19. The lugs 42 are of the same size.

The carrier part 19 is associated with the securing part 20 by extending the cylinder 34 of the part 20 into the cylinder 28 of the part 19, the spacer lugs 27 projecting through the openings 33 respectively in the part 20, and allowing axial movement of the part 20 with respect to the part 19. The carrier part 19 is then arranged on the bolts 12, the same being received respectively in the holes 26 in the part 19, and the nuts of the bolts 12 are then screwed home to securely fasten the carrier part 19 to the hub 10 to rotate with the latter. By reason of the lugs 25 of the carrier part 19 being engaged between and in contact at opposite sides with certain of the lugs 31 of the securing part 20, the latter will be caused to rotate with the carrier part 19 and will also have axial movement with respect thereto. The part 21, as shown in the present instance, is secured to the hub shell 14 interiorly thereof. The part 21 may be secured to the hub shell 14 in any practical manner so as to rotate therewith, but if desired the part 21 may be integral with the hub shell 14. The lugs 42 of the part 21 secured to the hub shell 14 are receivable respectively between the pairs of lugs 24 and 25 on the carrier part 19 by first moving the wheel W axially toward the brake drum 11, and then by turning the wheel in either direction. The lugs 25 of the carrier part 19 project radially outwardly beyond the lugs 24 so as to be engaged by the flange 41 of the part 21 to limit the axial movement of the wheel to a position in which the lugs 42 may be readily engaged between the pairs of lugs 24 and 25 by rotational movement of the wheel. The lugs 25, 31 and 42 may be beveled so as to facilitate inter-engagement of the parts, and the lugs 24 and 42 also may be rounded to facilitate engagement of the lugs 42. When the lugs 42 are engaged between the pairs of lugs 24 and 25 the wheel W will be prevented from axial movement with respect to the carrier part 19. Alternate lugs 25 of the carrier part 19 are disposed between and engage the adjacent lugs 31 of the securing part. The lugs 42 of the part 21, which, in driving position, lie opposite the engaging lugs 25, are not engaged by the adjacent lugs 31. The intervening lugs 42, however, are engaged by their adjacent lugs 31, which latter lugs 31 are not engaged by the lugs 25 adjacent thereto as shown most clearly in Figure 10. In other words, alternate lugs 25 are each in engagement with two of the lugs 31, while the other lugs 25 are out of engagement with adjacent lugs 31. Similarly, alternate lugs 42 are each in engagement with two of the lugs 31 while the other lugs 42 are out of engagement with the adjacent lugs 31. This is possible by reason of the fact that two of the lugs 25 are narrower than the other two lugs 25, with corresponding variations in the spaces between the lugs 25; because two of the spaces between the lugs 31 are smaller than the other two spaces with a corresponding variation in the circumferential size of the lugs 31; and because the lugs 42 are equal in size. These expedients or features are desirable so as to obviate accurate fitting of the parts which would add considerably to the cost of manufacture and would make it less convenient to engage the lugs 42 carried by the wheel in mounting the latter and also to prevent possible inconvenience in interchangeably using all of the wheels of a vehicle. It is to be understood, however, that any preferred number of lugs and openings, whereby the three main parts are interengageable, may be used and the sizes thereof may be varied to meet definite requirements as may be desired.

Figure 11:
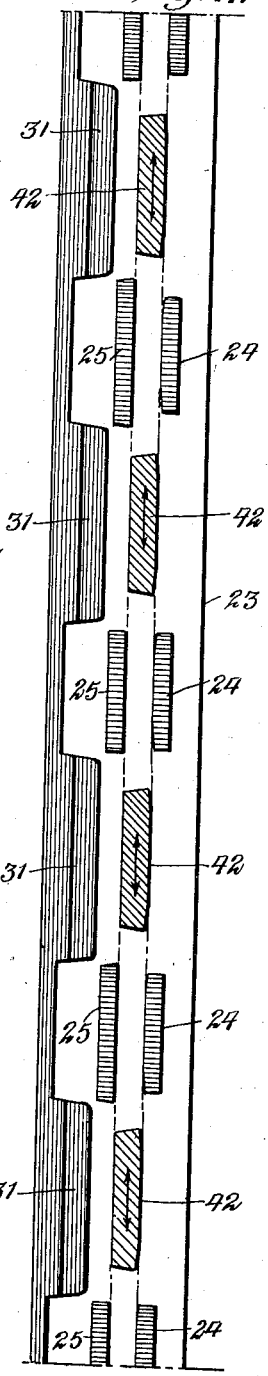
Figure 11 is a view similar to Figure 10 but illustrating the securing part in releasing position to enable the detachably secured part to be put into a position to be secured or to be removed from its position of securement.
Figure 9:
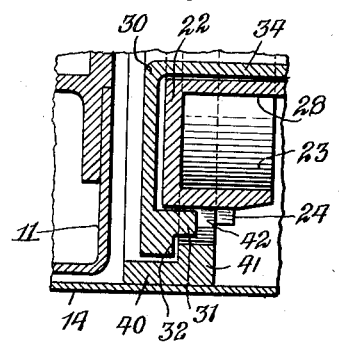
Figure 9 is an enlarged section taken on the line 9—9 of Figure 4, and looking in the direction indicated by the arrows.

A manually operable means is employed to retain the securing part 20 in its securing position, and also to allow said securing part 20 to be moved to a releasing position so that the lugs 42 may be engaged with the pairs of lugs 24 and 25 for the purpose of attaching the wheel W or disengaged for detaching the same. The said means includes a coil compression spring 45 which surrounds the hub 10 and is disposed within the cylinder 34 with one end thereof in engagement with the hub 10 and its opposite end in engagement with the head 35 of the cylinder 34. It is to be understood that the spring 45 will be arranged on the hub 10 before the parts 19 and 20 are assembled and the carrier part 19 is secured in place on the hub 10. The cylinder 28 has lugs 46 on the outer end thereof arranged diametrically opposite each other, and each of said lugs has a slot 47 therein extending longitudinally of the cylinder 28. Each lug 46 has a radially projecting pin 48, the pin 48 on one lug being in transverse axial alignment with the pin 48 on the other lug. The cylinder 34 has lugs 49 on the outer end thereof arranged diametrically opposite each other. Each lug 49 has a hole 50 therein, the hole 50 in one lug being in transverse axial alignment with the hole 50 in the other lug. When the parts 19 and 20 are operatively mounted or assembled the holes 50 will be in alignment with the slots 47, as shown in Figure 1. A handle 51 is employed, the same being substantially of U-shape and is constructed of spring material so as to be capable of being spread apart from a normal condition for purposes of assembly. The handle 51 has terminals 52 constituting arbors or pivots which are in axial alignment with each other. A cam 53 is secured to or formed integral with each terminal 52. By spreading the handle 51 the terminals 52 may be engaged respectively in the slots 47 in the lugs 46 and the holes 50 in the lugs 49. This will bring the cams 53 in engagement with the pins 48 respectively. The provision and arrangement are such that when the handle 51 is swung from a position at one side of the axis of the assembly to a releasing position paralleling said axis the cams 53 in engagement with the pins 48 will cause the terminals 52 to bear on the cylinder 34, causing the securing part 20 to move inwardly or axially toward the drum 11 against action of the spring 45 to a releasing position, as shown in Figure 11. The securing part 20 will be held in the releasing position until the handle is again manipulated to return it to its normal position, as shown in Figure 5.

It is obvious that when the securing part 20 has been moved to its releasing position it will be possible to engage the lugs 42 of the part 21 secured to the wheel between the pairs of lugs 24 and 25, or to disengage said lugs 42. When the handle 51 is returned from its releasing position to its securing position, the position of the cams 53 will be changed so that the spring 45 acting on the head 35 will cause the part 20 to move into its securing position, as shown in Figure 10. The lugs 46 have stops 54 respectively which are engaged by the cams 53 respectively to limit the movement of the handle 51 to its securing and releasing positions. The terminals 52 are beveled as at 55 to be received in V-shaped notches 56 in the head 35 to releasably retain the handle 51 in its securing position, the bevels 55 being held in the notches 56 by the spring tension of the handle, which is so arranged as to tend to close the gap between the terminals 52. If desired the cam means employed may be such that it is necessary to swing the handle 51 from one side of the axis of the assembly to the opposite side.

In accordance with another feature of the invention, stop means in the form of pins 59 are fixed on the cylinder 28 diametrically opposite each other in relation to the cams 53, so that when the securing part 20 is in its securing position, any external force tending to force the securing part 20 axially toward its releasing position, against the action of the spring 45, will cause cams 53 to abut against the pins 59, thereby positively stopping or preventing unintentional releasing of the securing part 20.

Figure 12:
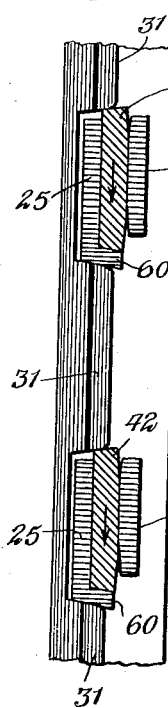
Figure 12 is a view similar to Figure 10 showing a modification of the carrier part.
Figure 13:
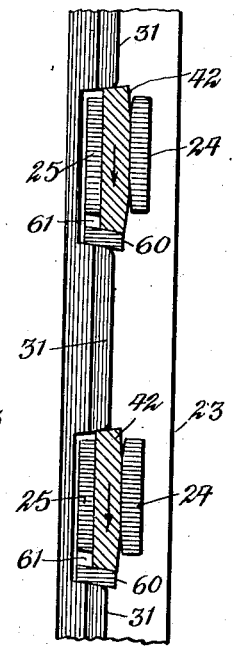
Figure 13 is a view similar to Figure 10 showing a further modification of the carrier part.

In Figure 12 there is shown a modification consisting of an abutment 60 on each of the lugs 25 of the carrier part, the said abutment 60 of each lug 25 being engaged by one of the lugs 42. The lugs 42 may be engaged by counter-clockwise rotation of the wheel in the present instance, and may be made to engage by clockwise turning of the wheel by having the abutment 60 on the opposite edge of each lug 25. With this modification each lug 31 engages one radial face of one lug 42 and one radial face of one abutment 60. If desired, a gap 61 may occur between each lug 25 and its adjacent abutment 60 in order to obtain a proper bevel of the abutment 60, as shown in Figure 13.

From the foregoing it will be understood that when the wheel is secured by the parts and in the manner hereinabove described the driving impulse will be as follows: From the hub 10 to the carrier part 19 through the intervention of the bolts 12, from the carrier part 19 to the securing part 20 through the intervention of certain of the lugs 25 in contact at opposite sides with certain of the lugs 31, and from the securing part 20 to the detachable part 21 through the intervention of certain of the lugs 31, contacting the opposite sides of certain lugs 42. Thus, the wheel W may be driven in either direction with the device of the present invention.

It is to be understood that the invention is not restricted to the precise construction and arrangement of the parts shown and described, as details of construction may be modified and rearranged without departing from the spirit of the invention, the scope of which is limited only by the terms of the appended claims.

I claim:—

1. In a securing device, a rotary part, a second part fixed on the rotary part to rotate therewith, a securing part engageable with the second part for rotation therewith and axial movement with respect thereto, a third part engageable with the second part to prevent axial movement of the third part with respect thereto, said securing part being engageable with the third part by the axial movement of the securing part in one direction into a securing position to secure the third part to rotate with the rotary part, and resilient means to retain said securing part in its securing position, and yieldable to allow said securing part to be moved to a releasing position, for the purpose of detaching said third part, and in combination, means operable to move said securing part against the action of the resilient means into its releasing position, and to retain it in said position, for the aforesaid purpose.

2. In a securing device, a rotary part, a second part fixed on the rotary part to rotate therewith, a securing part engageable with the second part for rotation therewith and axial movement with respect thereto, a third part engageable with the second part to prevent axial movement of the third part with respect thereto, said securing part being engageable with the third part by the axial movement of the securing part in one direction into a securing position to secure the third part to rotate with the rotary part, and resilient means to retain said securing part in its securing position, and yieldable to allow said securing part to be moved to a releasing position, for the purpose of detaching said third part, and in combination, manually operable means carried by said device which acts on said securing part to move said securing part against the action of the resilient means into its releasing position, and to retain it in said position, for the aforesaid purpose.

3. A wheel securing device comprising the combination of a rotatable structure, a separate traction wheel, coacting means on said structure and wheel whereby the wheel may be mounted on said structure by first moving the wheel axially with respect to the axis of the structure and then turning the wheel with respect to said structure, a securing member having axial movement and adapted to cooperate with said structure and wheel to secure the wheel while mounted on the structure to rotate with the latter, resilient means acting on the securing member to move it axially to its cooperative wheel securing position, and means to move said securing member against the action of the resilient means to an inactive position and to retain it therein, so that the wheel may be mounted as aforesaid, and also be detached.

4. A securing device including a rotary carrier part, a securing part, said carrier part having a cylinder, said securing part having a cylinder which extends into said first cylinder, interengaging means on said parts whereby the securing part will be caused to rotate with the carrier part and to permit the former to have movement with respect to the latter into and out of a securing position, and resilient means extending interiorly of the cylinder of the securing part and acting thereon to move it into its securing position and to retain it in such position, and in combination, pressure exerting and releasing means having a fulcrum on the cylinder of the carrier part and acting on the cylinder of the securing part to move the latter against the resilient means out of its securing position, and to retain it out of such position, said last means also being operable to release pressure on said securing part so that said resilient means may move the securing part into its securing position.

5. In a securing device, a carrier part, and a securing part movably engaged with the carrier part and movable into and out of a securing position, and in combination, a handle pivotally connected with the securing part, a fulcrum on the carrier part, a cam on the handle to ride on said fulcrum when the handle is swung in one direction on its pivotal connection to cause said securing part to move out of its securing position, and resilient means acting on said securing part to cause it to move into its securing position when said handle is swung reversely.

6. In a securing device, a carrier part, and a securing part movably engaged with the carrier part and movable into and out of a securing position, and in combination, a handle pivotally connected with the securing part, a fulcrum on the carrier part, a cam on the handle to ride on said fulcrum when the handle is swung in one direction on its pivotal connection to cause said securing part to move out of its securing position, resilient means acting on said securing part to cause it to move into its securing position when said handle is swung reversely, and means engageable by said cam to limit the movement of the handle in either direction.

7. In a securing device, a carrier part, and a securing part movably engaged with the carrier part and movable into and out of a securing position, and in combination, a handle pivotally connected with the securing part, a fulcrum on the carrier part, a cam on the handle to ride on said fulcrum when the handle is swung in one direction on its pivotal connection to cause said securing part to move out of its securing position, resilient means acting on said securing part to cause it to move into its securing position when said handle is swung reversely, said handle being made of spring material, and means coacting with the handle to prevent unintentional movement of the handle.

8. In a securing device, a rotary carrier part having spacer lugs spaced equidistantly on one side thereof, and radially outwardly extending lugs arranged in pairs spaced equidistantly, the lugs of each pair being spaced with respect to each other, a securing part having openings therein through which said spacer lugs extend respectively, to permit the securing part to move axially with respect to the carrier part, said securing part having axially extending lugs to engage certain of the radially outwardly extending lugs on the carrier part to cause the securing part to rotate with the carrier part, and a third part having radially inwardly extending lugs spaced equidistantly to be received between the lugs of said pairs respectively, to prevent axial movement of the third part with respect to the carrier part, and certain axially extending lugs on the securing part being engageable with certain of said lugs on the third part while the latter are received between the lugs of said pairs on the carrier part as aforesaid, to secure the third part to rotate with the carrier part.

9. A securing device comprising three parts interengageable with each other so as to be rotatable in unison, one of said parts being secured by the other two parts and being detachable from the other two parts by movement of one of said two parts to a releasing position, resilient means acting on the last mentioned part to resist movement thereof, and in combination, means operable to overcome the resistance of the resilient means and to cause movement of said last mentioned part into its releasing position so that the detachable part may be detached, and means which cooperates with the second means to prevent unintentional release of the last mentioned of said three parts.

10. In a securing device, a carrier part, a securing part, and a detachable part, said carrier part having equidistantly spaced pairs of radial lugs, the lugs of each pair being axially spaced equidistantly with respect to each other, one of the lugs of each alternate pair being smaller than the corresponding lug of each intervening pair, the detachable part having spaced radial lugs corresponding in number and arrangement to the spaces between the pairs of lugs on the carrier part and being engageable between the lugs of the pairs respectively, said securing part having spaced lugs corresponding in number and arrangement to the spaces between the pairs of lugs on the carrier part, alternate lugs on the securing part being engageable with certain of the lugs on the detachable part while the latter are engaged between the lugs of the pairs respectively on the carrier part to secure said detachable part, the intervening lugs on the securing part being at the same time engageable with the lugs adjacent thereto on the carrier part.

11. In a securing device, a carrier part, a securing part, and a detachable part, said carrier part having equidistantly spaced pairs of radial lugs, the lugs of each pair being axially spaced equidistantly with respect to each other, one of the lugs of each alternate pair being smaller than the corresponding lug of each intervening pair, the detachable part having spaced radial lugs corresponding in number and arrangement to the spaces between the pairs of lugs on the carrier part and being engageable between the lugs of the pairs respectively, said securing part having spaced lugs corresponding in number and arrangement to the spaces between the pairs of lugs on the carrier part, certain of the lugs on the securing part being engageable with certain of the lugs on the detachable part while the latter are engaged between the lugs of the pairs respectively on the carrier part to secure said detachable part, and certain of the lugs on the securing part also being engageable with certain of the lugs on the carrier part, the radial sides of the lugs on the securing part being outwardly beveled, and the lugs on the other parts being inwardly beveled to correspond to the bevel of the lugs on the securing part.

12. A securing device comprising three parts interengageable with each other, one of said parts being secured by the other two parts and being detachable from the other two parts by movement of one of said two parts to a releasing position, resilient means acting on the releasable part to resist movement thereof, and in combination, means engaged with said two parts operable to overcome the resistance of the resilient means and to cause movement of the releasable part into its releasing position so that the detachable part may be detached.

13. The combination of a hub, a traction wheel, and a device to detachably secure the wheel to the hub, said device including a securing part movable into and out of a securing position to secure and release the wheel, and manually operable pressure exerting and releasing means, said last means being engaged with means on said hub and said securing part to move the latter into and out of its securing position.

14. The combination of a hub, a traction wheel, and a device to detachably secure the wheel to the hub, said device including a securing part movable into and out of a securing position to secure and release the wheel, said securing part having a cylinder, resilient means arranged within the cylinder in contact therewith and in contact with the hub to move the securing part into its securing position and to retain it in said position, and manually operable pressure exerting and releasing means, said last means being engaged with means on said hub and said securing part to move the latter against the action of the resilient means out of its securing position, and to retain it out of such position, said last means also being operable to release pressure on said securing part so that said resilient means may move the securing part into its securing position.

15. The combination with a hub, a traction wheel, and a device to detachably secure the wheel to the hub, said device including a securing part movable into and out of a securing position to secure and release the wheel, and radially inwardly extending means on said wheel, said securing part having axially extending means engageable with said radially extending means on the wheel when the securing part is in its securing position to prevent movement of the wheel with respect to the hub, of a manually operable pressure exerting and releasing means, said last means being engaged with means on said hub and said securing part to move the latter into and out of its securing position.

16. The combination with a hub, a traction wheel, and a device to detachably secure the wheel to the hub, said device including a securing part movable into and out of a securing position to secure and release the wheel, radially inwardly extending means on said wheel, said securing part having axially extending means engageable with said radially inwardly extending means on the wheel when the securing part is in its securing position to prevent movement of the wheel with respect to the hub, said securing part having a cylinder, and resilient means arranged within the cylinder in contact therewith and in contact with the hub to move the securing part into its securing position and to retain it in said position, of a manually operable pressure exerting and releasing means, said last means being engaged with means on said hub and said securing part to move the latter against the action of the resilient means out of its securing position, and to retain it out of such position, said last means also being operable to release pressure on said securing part so that said resilient means may move the securing part into its securing position.

17. A device for detachably securing a vehicle wheel to a hub, including a spring actuated securing part engageable with means on the wheel, and in combination, means engaged with the hub and connected with said part operable to exert pressure on said part to disengage it from said means on the wheel, so that the wheel may be detached.

18. A device for detachably securing a vehicle wheel to a hub, including an axially movable securing part engageable with means on the wheel, a spring constantly acting on said part to retain it in engagement with said means, and in combination, means engaged with the hub and connected with said part operable to exert pressure on said part to move it axially against the action of said spring out of engagement with the means on said wheel, so that the wheel may be detached.

19. A device for detachably securing a vehicle wheel to a hub, including a spring actuated securing part engageable with means on the wheel to secure the wheel to said hub, and in combination, means operable to exert pressure on said part to disengage it from said means on the wheel, so that the wheel may be detached, and means which cooperates with the pressure exerting means, to prevent unintentional disengagement of said securing part.

THOMAS C. McVEAGH.